United States Patent
Koziel et al.

(10) Patent No.: US 11,943,353 B2
(45) Date of Patent: Mar. 26, 2024

(54) RANDOMIZATION METHODS IN ISOGENY-BASED CRYPTOSYSTEMS

(71) Applicant: PQSecure Technologies, LLC, Boca Raton, FL (US)

(72) Inventors: Brian C. Koziel, Plano, TX (US); Rami El Khatib, Boca Raton, FL (US)

(73) Assignee: PQSecure Technologies, LLC, Boca Raton, FL (US)

( * ) Notice: Subject to any disclaimer, the term of this patent is extended or adjusted under 35 U.S.C. 154(b) by 696 days.

(21) Appl. No.: 17/125,976

(22) Filed: Dec. 17, 2020

(65) Prior Publication Data

US 2022/0200802 A1  Jun. 23, 2022

(51) Int. Cl.
*H04L 9/30* (2006.01)
*H04L 9/08* (2006.01)

(52) U.S. Cl.
CPC .......... *H04L 9/3066* (2013.01); *H04L 9/0852* (2013.01); *H04L 9/0869* (2013.01)

(58) Field of Classification Search
CPC ....... G06F 7/58–588; H04L 9/30–3013; H04L 9/3066; H04L 9/0852; H04L 9/0869; H04L 2209/08
See application file for complete search history.

(56) References Cited

U.S. PATENT DOCUMENTS

2020/0104531 A1    4/2020  Kumar et al.
2020/0259648 A1*   8/2020  Koziel ................. H04L 9/0637

FOREIGN PATENT DOCUMENTS

EP          1691501 B1        4/2009
EP          2085878 A1  *     8/2009    ............. G06F 7/725
WO    WO-2022132186 A1 *     6/2022    ........... H04L 9/0852

OTHER PUBLICATIONS

Brier, Eric, and Marc Joye, "Fast point multiplication on elliptic curves through isogenies", in International Symposium on Applied Algebra, Algebraic Algorithms, and Error-Correcting Codes, pp. 43-50, 2003 (Year: 2003).*

* cited by examiner

*Primary Examiner* — Matthew D Sandifer
(74) *Attorney, Agent, or Firm* — Mark C. Johnson; Johnson Dalal

(57) ABSTRACT

A computer processing system having an isogeny-based cryptosystem for randomizing computational hierarchy to protect against side-channel analysis in isogeny-based cryptosystems.

6 Claims, 4 Drawing Sheets

| Double Point Multiplication | Large Degree Isogeny | J-invariant |
|---|---|---|
| $P = (X : Y : 1)$ | $R = [m]P + [n]Q$ | $E2 = \varphi : E1 \to E1/R$ |

| | | | $j(E2) == j(E2')$ |
|---|---|---|---|
| $P' = (rX : rY : r)$ | $R' = [m]P' + [n]Q$ | $E2' = \varphi : E1 \to E1/R'$ | |

RANDOMIZATION METHODS IN ISOGENY-BASED CRYPTOSYSTEMS

FIELD OF THE INVENTION

The present invention relates to generally to systems and methods that randomize the computational hierarchy in isogeny-based cryptosystems through elliptic curve arithmetic and mappings.

BACKGROUND OF THE INVENTION

Cryptology is the practice and study of techniques for secure communication in the presence of third parties called adversaries. More generally, cryptography is about constructing and analyzing protocols that prevent third parties or the public from reading private messages and includes various aspects in information security such as data confidentiality, data integrity, authentication, and non-repudiation. Applications of cryptography include electronic commerce, chip-based payment cards, digital currencies, computer passwords, and military communications. Cryptosystems are a suite of cryptographic algorithms needed to implement a particular security service, most commonly for achieving confidentiality. Due to the sensitive nature of internal computations required for a cryptography session, namely one utilizing post-quantum cryptography, the hardware or processing footprint must be protected from a variety of eavesdropping techniques. As such, utilizing methods to obfuscate internal computations and private information can increase the security of such systems.

Notably, physical implementations of cryptosystems must protect against side-channel analysis, or attack methods that utilize unintended information leakage, such as heat, power, timing, errors, and so on. Furthermore, post-quantum cryptosystems are relatively new with many unclear attack vectors. One major research thrust is to defend against side-channel analysis attacks (for which some attacks might not even be known) while still maintaining competitive performance, power, and area.

Therefore, a need exists to overcome the problems with the prior art as discussed above.

SUMMARY OF THE INVENTION

The invention provides a method for efficiently adding randomness to isogeny-based cryptosystems utilizing hard problems involving isogenies. By randomizing the computational hierarchy in these cryptosystems, these techniques provide more protection against side-channel attacks with small overhead.

In accordance with the present invention, a computer processing system is disclosed that includes an isogeny-based cryptosystem utilized with, i.e., incorporated in, attached or coupled to, and/or or part of, an electronic computing device that is operably configured to use an input to change an intermediate elliptic curve point to a new projective coordinate representation.

In further embodiments, the isogeny-based cryptosystem is operably configured to use the input to change the intermediate elliptic curve point to a new projective coordinate representation using finite field multiplications.

In additional embodiments of the present invention, the input to change the intermediate elliptic curve point to the new projective coordinate representation originates from inside or outside the electronic computing device.

In yet another embodiment of the present invention, the isogeny-based cryptosystem is operably configured to use a random input to randomize the intermediate elliptic curve point to the new projective coordinate representation.

In another embodiment of the present invention, a random number generator is operably configured to randomize the intermediate elliptic curve point to the new projective coordinate representation.

Also in accordance with the present invention, an isogeny-based cryptosystem is disclosed that is incorporated in an electronic computing device and that is operably configured to use an input to change an elliptic curve-based scalar by adding a multiple of a point's cardinality.

In accordance with another embodiment of the present invention, the input to change the elliptic curve-based scalar originates from inside or outside the electronic computing device.

In accordance with yet another embodiment of the present invention, the isogeny-based cryptosystem is operably configured to use a random input to randomize the elliptic curve-based scalar. Additionally, a random number generator is utilized and operably configured to randomize the elliptic curve-based scalar.

In accordance with an exemplary embodiment of the present invention, the elliptic curve-based scalar is operably configured to be utilized in a point multiplication operation and a point addition operation.

In additional embodiments of the present invention, the point addition operation operably configured to utilize a result of a separate point multiplication operation.

The present invention also discloses the use of a computer processing system having an isogeny-based cryptosystem incorporated inside of an electronic computing device that is operably configured to use an input to perform an isomorphism operation to convert an intermediate elliptic curve or point to an isomorphic elliptic curve or an isomorphic elliptic point.

In accordance with an embodiment of the present invention, the isogeny-based cryptosystem is operably configured to use a random input to randomize the isomorphism operation. Also, a random number generator is utilized and is operably configured to randomize the isomorphism operation.

Also in accordance with the present invention, a computer processing system is disclosed that includes an isogeny-based cryptosystem incorporated inside of an electronic computing device that is operably configured to use an input to select an isogeny formula to apply during an isogeny computation of a fixed isogeny degree.

With the foregoing and other objects in view, there is provided, in accordance with the invention, a computer processing system for utilizing hard problems of isogenies.

In accordance with a further feature of the present invention, the computer processing system uses some entropy pool of random data to randomize an intermediate elliptic curve point to a new projective coordinate representation with only a few field multiplications.

In accordance with another feature, the computer processing system uses some entropy pool of random data to randomly scale elliptic curve-based scalars before double-point elliptic curve multiplication operations as well as elliptic curve point multiplication and add operations.

In accordance with another feature, the computer processing system uses some entropy pool of random data to convert an intermediate elliptic curve or point to an isomorphic elliptic curve or an isomorphic elliptic point.

In accordance with another feature, the computer processing system uses some entropy pool of random data to select an isogeny formula during any isogeny computation.

Although the invention is illustrated and described herein as embodied in a computer processing systems and methods for randomizing in isogeny-based cryptosystems, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of any processing chip. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
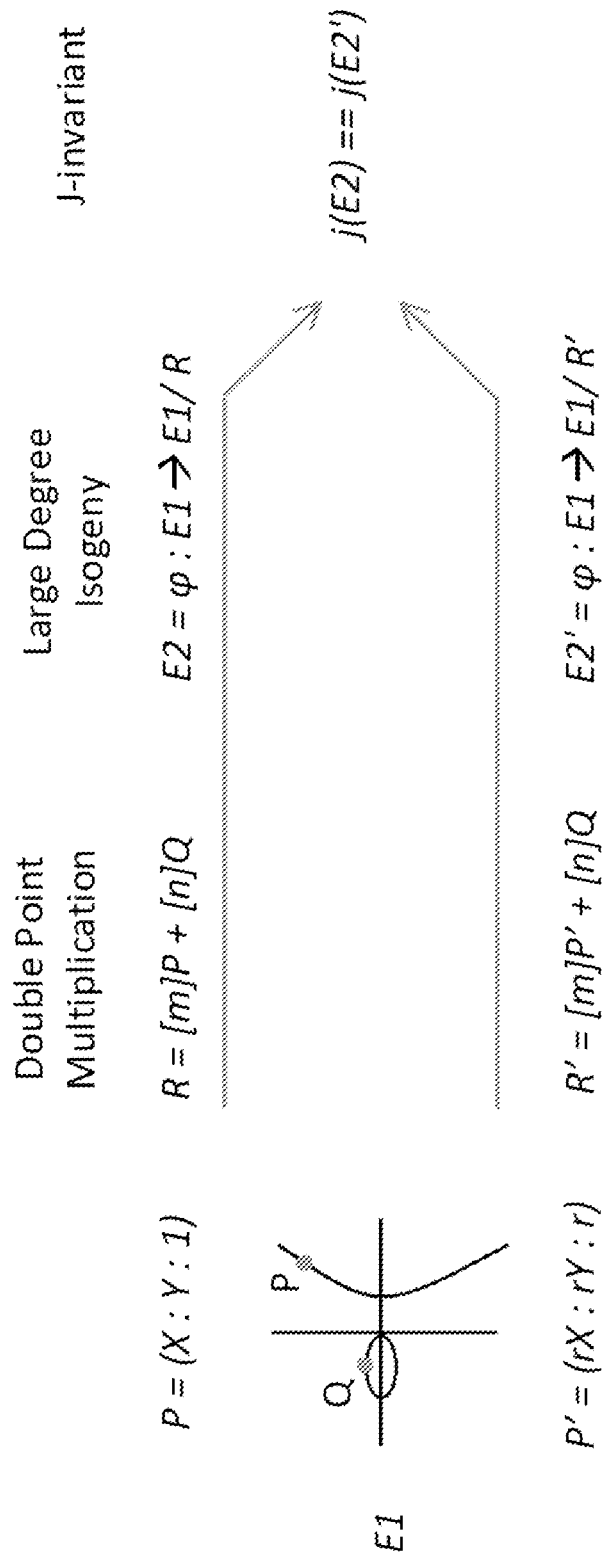
FIG. 1 illustrates a SIDH/SIKE setting where the input point P is converted to a random projective representation and is used in an isogeny computation. There is a sequence from left to right that shows the computations needed to return the elliptic curve E2 or E2'. These steps include a double point multiplication, large degree isogeny, and j-invariant computation that returns the isomorphism class of the final elliptic curve. The top half of this flow illustrates the naive order of operations whereas the bottom half includes a random projective randomization computation. Note that this random projective operation can be performed at any point within the whole isogeny computation hierarchy. The joining arrows on the right show that even though the intermediate computations and representations changed, the resulting elliptic curve of the naïve and randomized implementations is still in the same isomorphism class.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient method to add randomness to processing systems implementing isogeny-based cryptosystems. By cleverly using elliptic curve properties and formulas, this randomness can be added to an electronic computing device, e.g., an IOT device, with only a small overhead.

The primary application for introducing randomness to a cryptosystem is to defend against side-channel analysis attacks to an electronic computing device. In particular, a malicious third party can eavesdrop on a target's power, timing, electromagnetic radiation, error messages, and so on, to break a cryptosystem without breaking its underlying hard problem. Power and timing attacks can be particularly deadly, possibly even revealing any secret keys used by the implementation. Simple power analysis and differential power analysis are two such techniques that target the power side-channel. By using an oscilloscope or other similar tool, these power analysis attacks detect computational patterns to reveal a target's private information. The goal in adding randomness to computations in a cryptosystem is to make detection of these patterns significantly more expensive in terms of time and money.

Public-key cryptography is the study of exchanging secrets over an insecure public channel. By using hard problems such as the discrete logarithm problem or isogeny problem, data confidentiality, data integrity, authentication, and non-repudiation can be achieved. Given today's technology and future advances, the computational infeasibility of these hard problems means that it will be thousands or many orders of magnitudes of years to break the cryptosystem. The primary cryptosystem primitives we describe in the following are public key exchange whereby two parties agree on a shared secret over an insecure channel and digital signature where one party digitally signs content with his private key and any other party can digitally verify this signed content with the public key associated with the signer's private key. Other primitives exist, such as authenticated key exchange, public key encryption, and zero-knowledge proofs. In the following, we will describe an instantiation of our invention given known isogeny and elliptic curve cryptosystems. The spirit of the invention is not limited to such an example but expands to any future simultaneous deployment of isogeny and elliptic curve cryptosystems.

Isogeny-based cryptography is cryptography based on isogenies, or algebraic morphisms that is surjective and has a finite kernel, among a group. In modern-day cryptography, isogenies on elliptic curve groups is thought to be a hard problem, even for quantum computers. As those of skill in the art will appreciate, an isogeny on elliptic curves $\varphi: E_1 \to E_2$ is a non-rational map of all points on $E_1$ to $E_2$ that preserves the point at infinity. Given a finite kernel and $E_1$, it is simple to compute $E_2$, the isogeny of $E_1$ using the finite kernel. However, given only $E_1$ and $E_2$, it is a computationally intensive task to compute finite kernel used for the isogeny from $E_1$ to $E_2$, which is the foundation of isogeny-based cryptography. Some examples of isogeny-based cryptography include, but not limited to, the supersingular isogeny Diffie-Hellman ("SIDH") key exchange protocol, commutative supersingular isogeny Diffie-Hellman ("CSIDH") key exchange protocol, supersingular isogeny key encapsulation ("SIKE") mechanism, and SeaSign isogeny signatures. Each of these are isogeny-based cryptosystems that are based on the hardness of isogenies on elliptic curves. The cryptosystem parameters differ in many ways. However, efficient implementation of these cryptosystems can be designed such that they also provide protections from outside observers.

In the following, we describe each of our randomization techniques in terms of, but not limited to, computations shared by both SIDH and SIKE cryptosystems. In these two cryptosystems, secret isogenies are computed in the same manner. Consider the computation $\varphi: E_1 \to E_2$ in the SIDH and SIKE setting. First, a secret kernel that defines the isogeny is computed by the double point multiplication $R=[m]P+[n]Q$, where R, P, and Q are on $E_1$ and m and n are secret scalars. Second, the large-degree isogeny $\varphi$ is computed by the path defined by R, $\varphi: E_1 \to E_2 = \varphi : E_1 \to E_1/\langle R \rangle$ ). Here, $\varphi$, R, m, and n are critical internal computations, that if revealed through differential power analysis or other attacks could break the SIDH and SIKE foundational security problem.

The computations in SIDH and SIKE are generally carried out in a sequential manner. Intermediate values are stored in registers to represent intermediate elliptic curves or points. The above isogeny computation is entirely deterministic. Thus, naïve implementations could inadvertently leak private internal information. This innovation adds randomness to these computations to change the computational paths to reach the final value.

In each case, this innovation claims to add the randomness at any point in the isogeny-based system. The most common place to insert randomness is at the beginning of the protocol. However, this does not fit all cases where one computation always converges to the same result. Thus, there are scenarios where any one of these randomness techniques may be applied to a cryptosystem implementation at multiple computational points. One direct example is the SIDH and SIKE setting. Here, one may compute the kernel point $R=[m]P+[n]Q$, convert the projective point back to the affine representation, and then proceed with the large-degree isogeny. This conversion from projective to affine removes the computational randomness from this point forward as the isogeny formulas will follow a deterministic computation order.

The first randomness innovation, as best depicted and represented in FIG. 1, is to randomly change the projective representation of any intermediate point in the isogeny computation. A simple representation of an elliptic curve point is its affine representation, (x,y). However, for better performance and several other benefits, implementations typically represent an elliptic curve point in projective coordinates, (X:Y:Z), which can be converted back to affine with the formulas $$x = \frac{X}{Z}, y = \frac{Y}{Z}.$$

Thus, we can change an elliptic curve point to a random projective representation by multiplying X, Y, and Z by a random value. The main innovation here is to apply this randomness technique at any intermediate value in the isogeny computation setting. Some examples include before the double-point multiplication, during the double-point multiplication, during the isogeny computation, and so on. Furthermore, this innovation recognizes various projective-like representations of elliptic curve coordinates, such as Kummer x-only (X:Z) with $$x = \frac{X}{Z}$$

and Jacobian (X:Y:Z) with $$x = \frac{X}{Z^2}, y = \frac{Y}{Z^3}.$$

For this first randomization technique as well the others, it is not immediately clear that this technique will change the computational hierarchy and will still result in the correct answer. This is illustrated in FIG. 1. Given correct projective point arithmetic and isogeny formulas, changing the projective representation of an affine point will not alter the final isogeny result. In general, isogeny-based cryptography uses the movement from curve to curve to find a final elliptic curve class that is identified by its j-invariant. A projective point is an extension of an affine point, but can be reduced back to its affine representation. Projective point formulas for elliptic curve arithmetic and isogeny arithmetic can be developed from the geometric relationship of points on curves in their affine representation. Thus, by using the basis extension and arranging terms used in the projective representation, projective point arithmetic and isogeny formulas will produce the same result. Furthermore, each formula updates all coordinates used in a projective representation which will generally change based on the input projective point.

Figure 2:
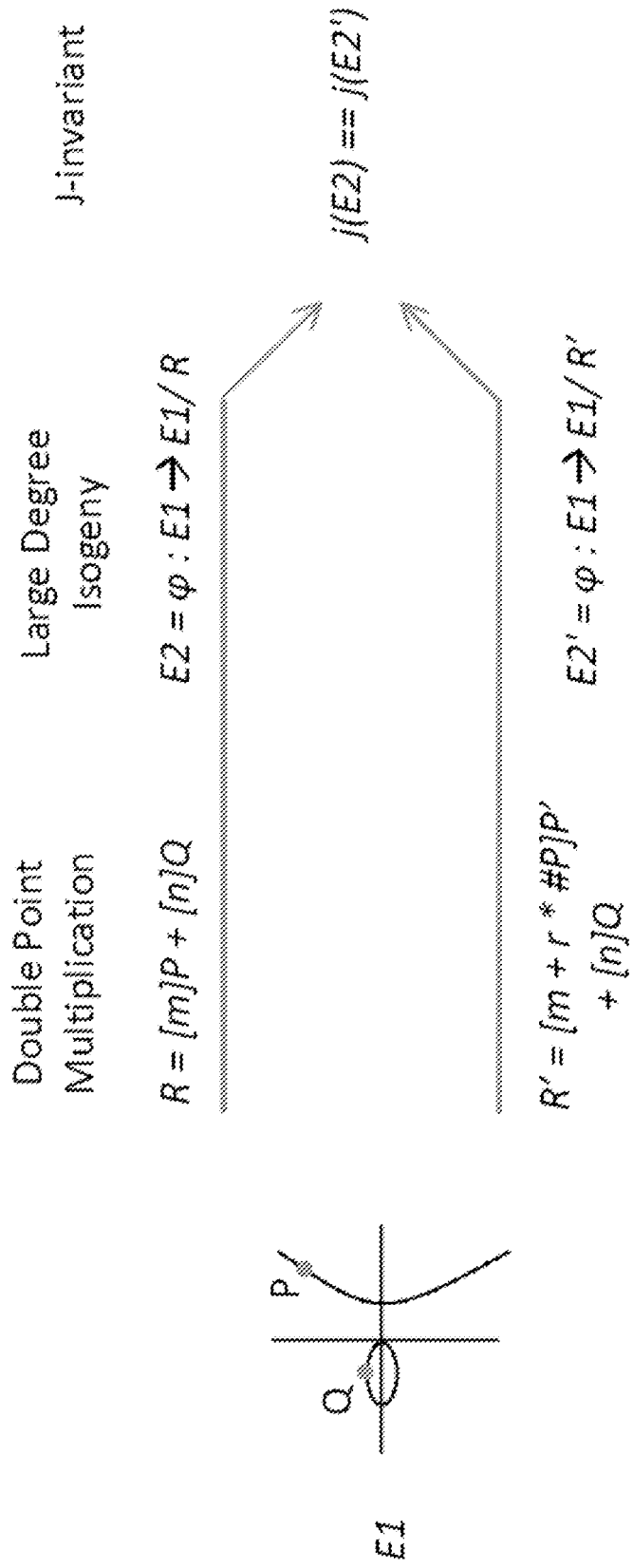
FIG. 2 illustrates a SIDH/SIKE setting where a scalar in the double point multiplication is randomized by adding a multiple of the point. There is a sequence from left to right that shows the computations needed to return the elliptic curve E2 or E2'. These steps include a double point multiplication, large degree isogeny, and j-invariant computation that returns the isomorphism class of the final elliptic curve. The top half of this flow illustrates the naïve order of operations whereas the bottom half includes a random randomization computation. The joining arrows on the right show that even though the intermediate computations and representations changed, the resulting elliptic curve of the naïve and randomized implementations is still in the same isomorphism class.

The second randomization technique, as best depicted and represented in FIG. 2, focuses on randomizing the representation of the scalars used in the double-point multiplication, R=[m]P+[n]Q. Since the elliptic curve is a cyclic group, adding the order of the point will result in adding the zero element. For instance, instead of m, the scalar for P can be m+r·#P, where r is some random integer and #P is the order of point P. Similarly, some multiple of the order of point Q can be added to n to produce the same resulting point, but with a larger scalar. One general optimization to SIDH and SIKE has been to set m=1, so that R=P+[n]Q. This randomization technique can still be applied to the elliptic curve multiply and add operation.

For this second randomization technique, this is an application of the cyclic nature of point arithmetic which does not inhibit the isogeny operation. As is shown in FIG. 2, the input scalars of the double-point multiplication have changed, but since the resulting point is the same affine point, the following isogeny operations will still compute the correct result. Furthermore, given the nature of projective coordinate arithmetic, the resulting projective point R will have a different result depending on what multiple of point P's cardinality was used.

Figure 3:
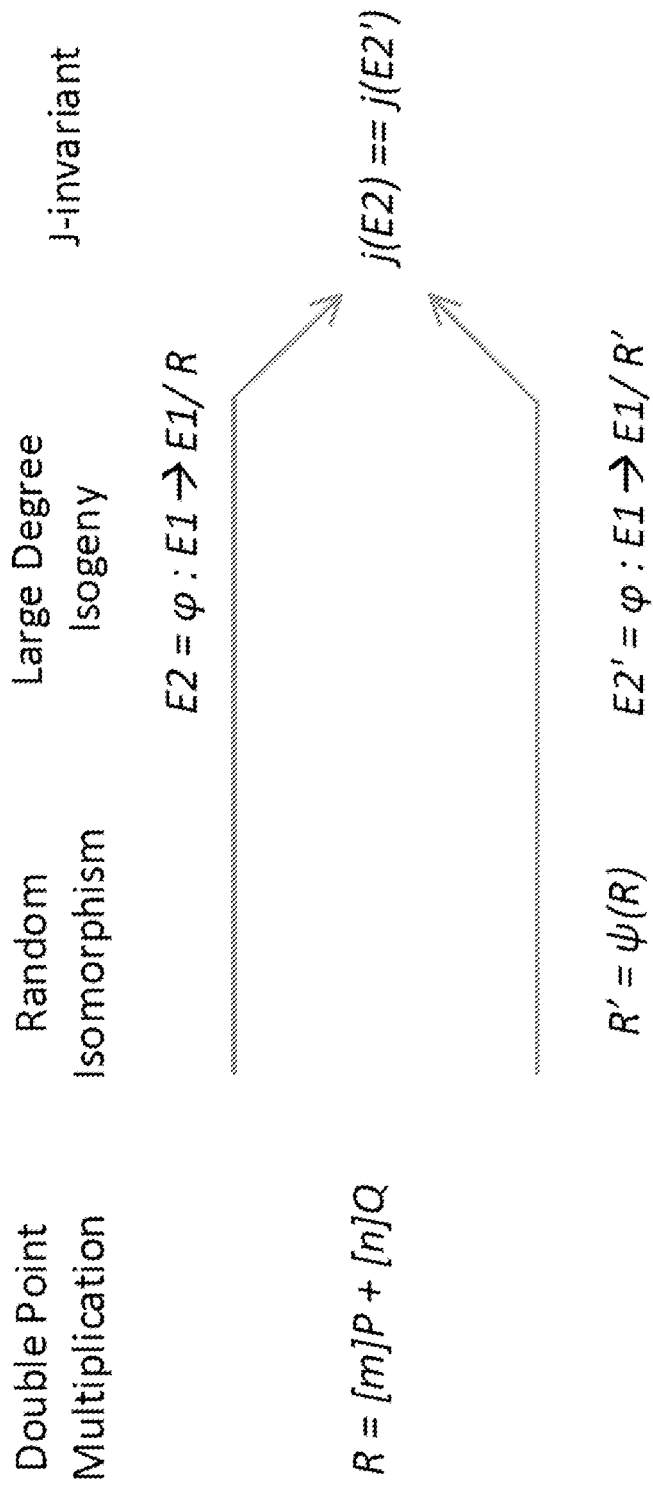
FIG. 3 illustrates a SIDH/SIKE setting where the kernel point is pushed through a random isomorphism. There is a sequence from left to right that shows the computations needed to return the elliptic curve E2 or E2'. These steps include a double point multiplication, large degree isogeny, and j-invariant computation that returns the isomorphism class of the final elliptic curve. The top half of this flow illustrates the naïve order of operations whereas the bottom half includes a random elliptic curve isomorphism computation. Note that there is no random isomorphism applied in the naïve order. Also note that this random isomorphism can be performed at any point in this flow. The joining arrows on the right show that even though the intermediate computations and representations changed, the resulting elliptic curve of the naïve and randomized implementations is still in the same isomorphism class.

The third randomization technique, as best depicted and represented in FIG. 3, randomizes both the representation of the curve and any corresponding points through an elliptic curve isomorphism, ψ: E→E' and ψ: P→P'. An isomorphism is a type of isogeny that does not change elliptic curve isomorphism classes. Here, we randomly choose a value that defines the isomorphism pp and push both the curve and points through this isomorphism. As an example, consider the short Weierstrass form of an elliptic curve: E: $y^2=x^3+ax+b$ with point P $(x_p, y_p)$. The isomorphism defines the mapping from E to E', where E': $y^2=x^3+a'x+b'$. One simple mapping is give a random value u is to compute P' $(u^{-2}x_p, u^{-3}y_p)$ and E': $y^2=x^3+u^4ax+u^6b$. This countermeasure can be adopted at any point of the isogeny computation, such as during kernel point generation or before computing any elliptic curve mapping. Furthermore, this innovation targets any type of elliptic curve point representation, again including the Kummer or Jacobian representations.

In this third randomization scenario, an isomorphism is a type of isogeny, but still returns the correct result. An isomorphism does not change the elliptic curve isomorphism class so any further computations can still return the correct result. FIG. 3 shows an example of double-point multiplication and the large-degree isogeny whereby both results return the equivalent value. Although the elliptic curve isomorphism class is not changed, the representation of both the elliptic curve and the elliptic curve point are altered, so the computational hierarchy in point arithmetic or isogeny arithmetic has been altered.

Figure 4:
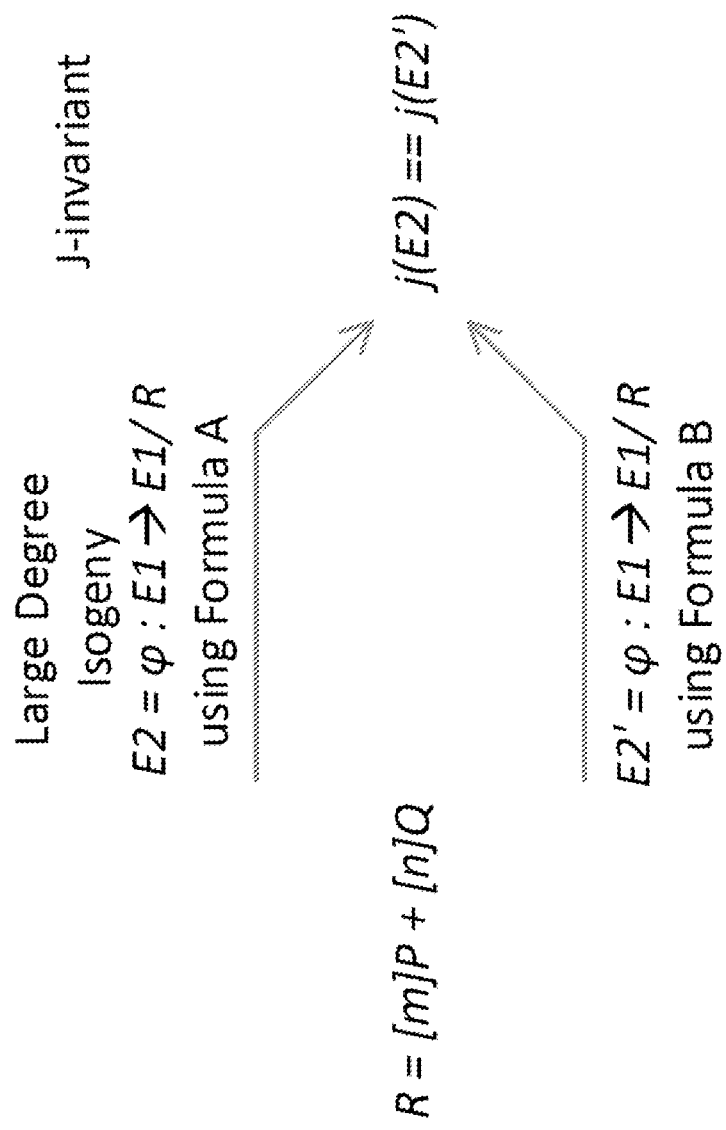
FIG. 4 illustrates an isogeny computation performed with two separate isogeny formulas. The kernel is the same for both isogenies, but the computation order and resulting curve may be different depending on the formulas. The joining arrows show that even though the isogeny computations may produce different results, the j-invariant of the curves will be identical indicating that the choice of formula did not alter the final result.

The fourth randomization technique, as best depicted and represented in FIG. 4, is to switch between isogeny formulas during an isogeny computation. For instance, if the large-degree isogeny is composed of multiple degree-2 isogenies (where 2 is the fixed isogeny degree), then performing half the isogenies with one set of isogeny formulas and the other half with another set of isogeny formulas will alter the computational tree for the result. FIG. 4 shows two different isogeny computations, one with formula A and the other with formula B. Given a defined kernel, both isogeny formulas will return a curve with the correct isomorphism class. These resultant curves will be isomorphic to each other, but not necessary the same curve. Throughout the history of isogeny-based cryptography, many different formulas for computing basic isogenies have been proposed and evaluated. Some are more optimized than others and some may use less memory. Based on precomputed computations and isogeny flow, the computations involved in these formulas have evolved which produce different elliptic curves when used.

What is claimed is:

1. A computer processing system comprising:
an isogeny-based cryptosystem utilized with an electronic computing device that is operably configured to perform a sequence of isogeny computations and use a random input to randomize and change an intermediate elliptic curve point within the sequence of isogeny computations to a new projective coordinate representation.

2. The computer processing system according to claim 1, wherein:
the isogeny-based cryptosystem is operably configured to use the input to change the intermediate elliptic curve point to a new projective coordinate representation using finite field multiplications.

3. The computer processing system according to claim 1, wherein:
the input to change the intermediate elliptic curve point to the new projective coordinate representation originates from inside or outside the electronic computing device.

4. The computer processing system according to claim 1, further comprising:
a random number generator operably configured to randomize the intermediate elliptic curve point to the new projective coordinate representation.

5. A computer processing system comprising:
an isogeny-based cryptosystem utilized with an electronic computing device that is operably configured to perform a sequence of isogeny computations and use a random input to perform and randomize an isomorphism operation, within the sequence of isogeny computations, to convert an intermediate elliptic curve or point to an isomorphic elliptic curve or an isomorphic elliptic point.

6. The computer processing system according to claim 5, further comprising:
a random number generator operably configured to randomize the isomorphism operation.

* * * * *